(12) United States Patent
Freitag et al.

(10) Patent No.: US 7,119,997 B2
(45) Date of Patent: Oct. 10, 2006

(54) SPIN VALVE SENSOR HAVING AN ANTIPARALLEL (AP) SELF-PINNED LAYER STRUCTURE COMPRISING COBALT FOR HIGH MAGNETOSTRICTION

(75) Inventors: James Mac Freitag, San Jose, CA (US); Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 113 days.

(21) Appl. No.: 10/675,832

(22) Filed: Sep. 30, 2003

(65) Prior Publication Data
US 2005/0068693 A1    Mar. 31, 2005

(51) Int. Cl.
*G11B 5/127* (2006.01)
(52) U.S. Cl. .................................. 360/324.11
(58) Field of Classification Search ........... 360/324.11, 360/324, 324.1, 313, 126, 324.2
See application file for complete search history.

(56) References Cited

U.S. PATENT DOCUMENTS

| | | | |
|---|---|---|---|
| 5,583,725 | A | 12/1996 | Coffey et al. |
| 5,768,069 | A | 6/1998 | Mauri |
| 5,796,561 | A | 8/1998 | Mauri |
| 5,920,446 | A | 7/1999 | Gill |
| 6,040,961 | A | 3/2000 | Gill |
| 6,181,534 | B1 * | 1/2001 | Gill ........................ 360/324.11 |
| 6,191,926 | B1 | 2/2001 | Everitt et al. |
| 6,208,492 | B1 | 3/2001 | Pinarbasi |
| 6,219,208 | B1 | 4/2001 | Gill |
| 6,219,209 | B1 | 4/2001 | Gill |
| 6,226,159 | B1 * | 5/2001 | Pinarbasi ................ 360/324.11 |
| 6,356,419 | B1 * | 3/2002 | Gill ........................ 360/324.11 |
| 6,396,734 | B1 | 5/2002 | Ishikawa et al. |
| 6,452,763 | B1 * | 9/2002 | Gill ........................ 360/324.11 |
| 6,456,469 | B1 * | 9/2002 | Gill ........................ 360/324.11 |
| 6,613,380 | B1 * | 9/2003 | Gill ............................. 427/131 |
| 6,700,755 | B1 * | 3/2004 | Pinarbasi ................ 360/324.11 |
| 6,700,760 | B1 * | 3/2004 | Mao ......................... 360/324.2 |
| 6,785,102 | B1 * | 8/2004 | Freitag et al. ......... 360/324.11 |
| 6,888,706 | B1 * | 5/2005 | Ooshima ................ 360/324.12 |

(Continued)

OTHER PUBLICATIONS

T. Dimopoulos et al., Enhanced robustness and tunnel magnetoresistance in artificial femmagnet based tunnel junctions, Journal of Applied Physics, May 1, 2000, 4685-4687, 87-9.

(Continued)

*Primary Examiner*—Allen Cao
(74) *Attorney, Agent, or Firm*—John J. Oskorep, Esq.; Matthew Zises

(57) ABSTRACT

In one illustrative embodiment of the invention, a spin valve sensor of a magnetic head has a free layer structure; an antiparallel (AP) self-pinned layer structure; and a non-magnetic electrically conductive spacer layer in between the free layer structure and the AP self-pinned layer structure. The AP self-pinned layer structure includes a first AP pinned layer; a second AP pinned layer; an antiparallel coupling (APC) layer formed between the first and the second AP pinned layers. At least one of the first and the second AP pinned layers is made of cobalt having no iron content. The other AP pinned layer may be formed of cobalt, cobalt-iron, or other suitable material. The use of cobalt in the AP self-pinned layer structure increases its magnetostriction to increase the self-pinning effect. Preferably, the first AP pinned layer is cobalt-iron and the second AP pinned layer is cobalt which provides for both an increase in magnetostriction and magnetoresistive coefficient $\Delta r/R$ of the sensor.

15 Claims, 9 Drawing Sheets

U.S. PATENT DOCUMENTS

| | | |
|---|---|---|
| 6,985,338 B1 * | 1/2006 | Gill ..................... 360/324.12 |
| 2001/0040780 A1 | 11/2001 | Pinarbasi |
| 2002/0024778 A1 | 2/2002 | Xue et al. |
| 2002/0135952 A1 | 9/2002 | Gill |
| 2002/0181169 A1 | 12/2002 | Pinarbasi |
| 2005/0068686 A1 * | 3/2005 | Freitag et al. ........... 360/324.1 |
| 2005/0068692 A1 * | 3/2005 | Freitag et al. ......... 360/324.11 |
| 2005/0068693 A1 * | 3/2005 | Freitag et al. ......... 360/324.11 |
| 2005/0141146 A1 * | 6/2005 | Pinarbasi ................ 360/324.1 |

OTHER PUBLICATIONS

M. Hehn, Properties of transport of magnetic junctions tunnel containing antiferromagnetic artificial structures—Effect of the structure in fields on the form and the amplitude of the magneto resistance, www.tpm.u-nancy.fr.

M. Saito et al., PtMn spin valve with synthetic ferrimagnet free and pinned layers, Journal of Applied Physics, May 1, 2000, 6974-6976, 87-9.

* cited by examiner

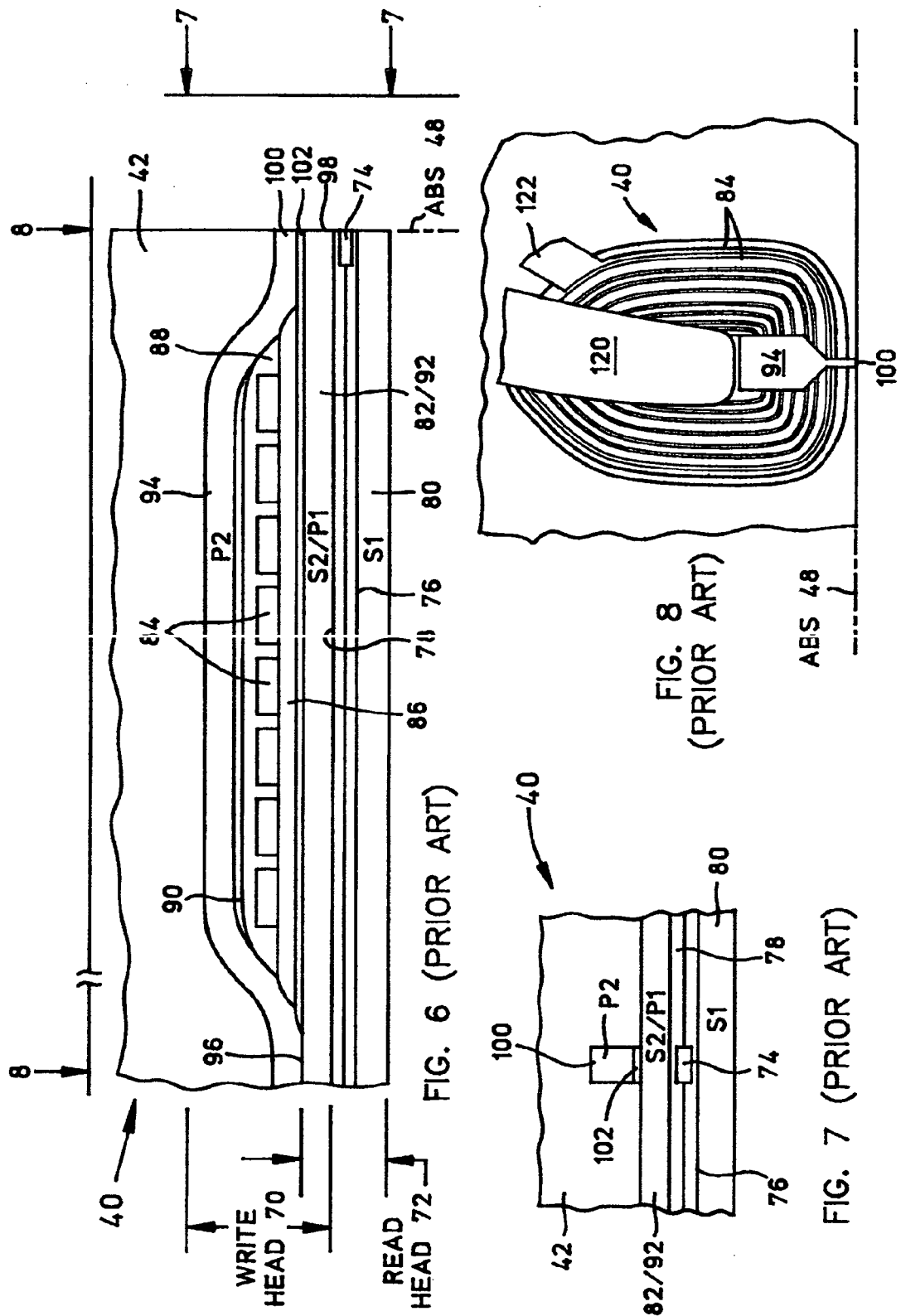

(ABS)

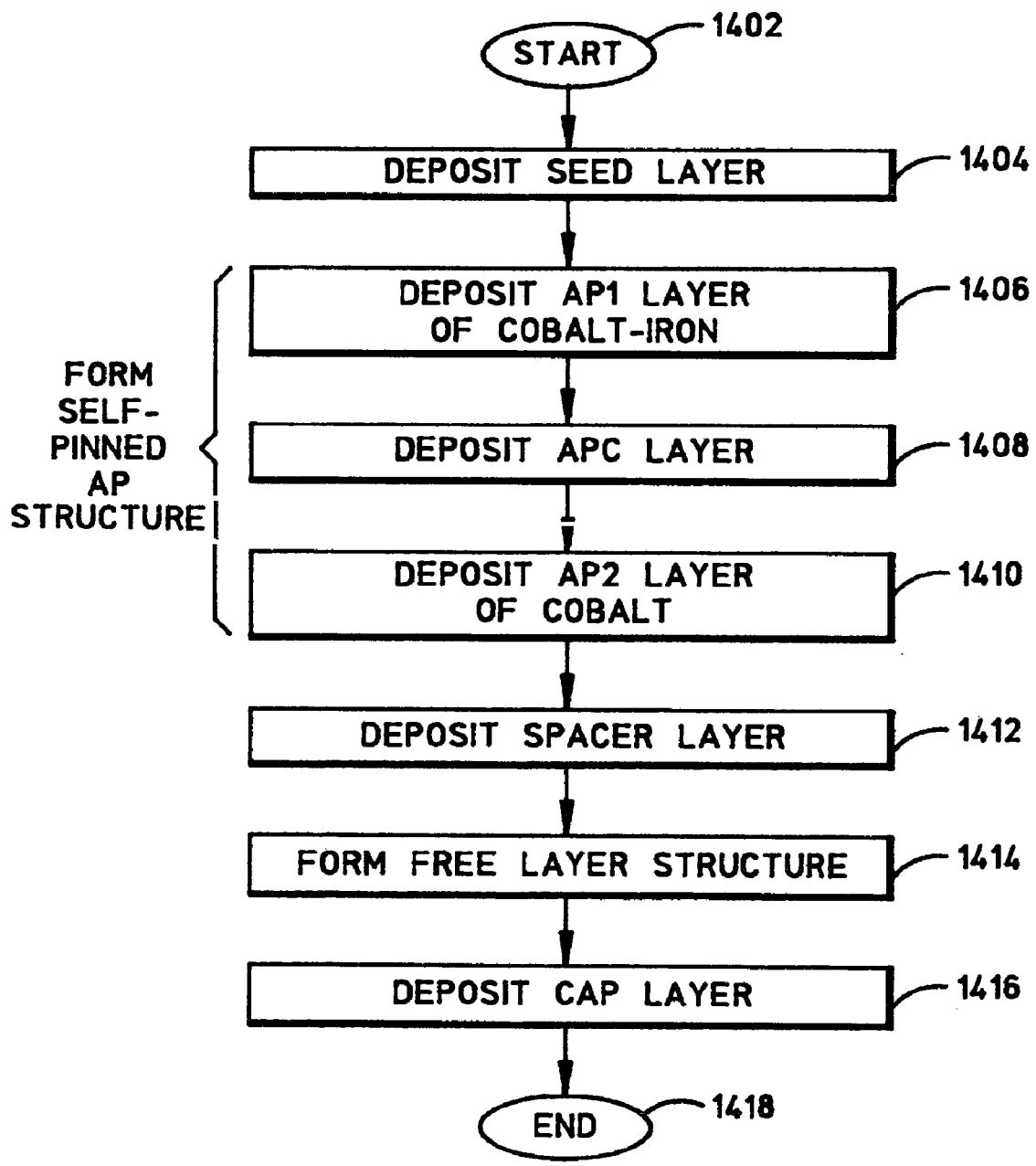

SPIN VALVE SENSOR HAVING AN ANTIPARALLEL (AP) SELF-PINNED LAYER STRUCTURE COMPRISING COBALT FOR HIGH MAGNETOSTRICTION

BACKGROUND OF THE INVENTION

1. Field of the Invention

This invention relates generally to spin valve sensors of magnetic heads, and more particularly to the use of one or more cobalt layers in antiparallel (AP) self-pinned layer structures of spin valve sensors.

2. Description of the Related Art

Computers often include auxiliary memory storage devices having media on which data can be written and from which data can be read for later use. A direct access storage device (disk drive) incorporating rotating magnetic disks are commonly used for storing data in magnetic form on the disk surfaces. Data is recorded on concentric, radially spaced tracks on the disk surfaces. Magnetic heads including read sensors are then used to red data from the tracks on the disk surfaces.

In high capacity disk drives, magnetoresistive read (MR) sensors, commonly referred to as MR heads, are the prevailing read sensors because of their capability to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which the MR element resistance varies as the square of the cosine of the angle between the magnetization of the MR element and the direction of sense current flow through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers.

GMR sensors using two layers of ferromagnetic material (e.g. nickel-iron, cobalt-iron, or nickel-iron-cobalt) separated by a layer of nonmagnetic material (e.g. copper) are generally referred to as spin valve (SV) sensors manifesting the SV effect. In an SV sensor, one of the ferromagnetic layers, referred to as the pinned layer, has its magnetization typically pinned by exchange coupling with an antiferromagnetic (AFM) pinning layer (e.g., nickel-oxide, iron-manganese, or platinum-manganese). The pinning field generated by the AFM pinning layer should be greater than demagnetizing fields to ensure that the magnetization direction of the pinned layer remains fixed during application of external fields (e.g. fields from bits recorded on the disk). The magnetization of the other ferromagnetic layer, referred to as the free layer, however, is not fixed and is free to rotate in response to the field from the information recorded on the magnetic medium (the signal field).

The pinned layer may be part of an antiparallel (AP) pinned layer structure which includes an antiparallel coupling (APC) layer formed between first and second AP pinned layers. The first AP pinned layer, for example, may be the layer that is exchange coupled to and pinned by the AFM pinning layer. By strong antiparallel coupling between the first and second AP pinned layers, the magnetic moment of the second AP pinned layer is made antiparallel to the magnetic moment of the first AP pinned layer. In a self-pinned spin valve sensor, however, the first AP pinned layer is not pinned by the AFM layer but is rather "self-pinned". A spin valve sensor of this type relies on magnetostriction of the AP self-pinned layer structure as well as the air bearing surface (ABS) stress for a self-pinning effect. Conventionally, cobalt-iron material is used for both the first and the second AP pinned layers. An AFM pinning layer, which is typically as thick as 150 Angstroms, is no longer necessary for pinning so that a relatively thin sensor can be advantageously fabricated.

There are several properties of a spin valve sensor which, if improved, will improve the performance of the magnetic head and increase the data storage capacity of a disk drive. It is generally desirable to increase the magnetoresistive coefficient Δr/R of any spin valve sensor without having to substantially increase its thickness. An increase in this spin valve effect (i.e. Δr/R) equates to higher bit density (bits/square-inch of the rotating magnetic disk) read by the read head.

A spin valve sensor utilizing a self-pinned structure achieves higher bit densities with its thinner profile and increased sensitivity. However, attempts have been made to increase the magnetostriction of the AP self-pinned layer structure to improve its self-pinning effect. These attempts involve either changing the pinned layer materials or changing the seedlayer materials beneath the structure. By proportionally increasing the iron content in cobalt-iron pinned layers, for example, the magnetostriction was shown to increase. For example, the magnetostriction increased by about a factor of two (2) using $Co_{60}Fe_{40}$ materials in the AP pinned layers. However, interdiffusion due to high iron levels rendered these materials unsuitable for application.

As described, efforts continue to improve the properties of spin valve sensors. What are needed are ways in which to increase the magnetostriction of an AP self-pinned layer structure while maintaining an acceptable magnetoresistive coefficient Δr/R.

SUMMARY

In one illustrative embodiment of the invention, a spin valve sensor of a magnetic head has a free layer structure; an antiparallel (AP) self-pinned layer structure; and a non-magnetic electrically conductive spacer layer formed between the free layer structure and the AP self-pinned layer structure. The AP self-pinned layer structure includes a first AP pinned layer; a second AP pinned layer; an antiparallel coupling (APC) layer formed between the first and the second AP pinned layers. At least one of the first and the second AP pinned layers is made of cobalt having no iron content. The other AP pinned layer may be made of cobalt, cobalt-iron, or other suitable material.

Advantageously, cobalt in the AP self-pinned layer structure increases the magnetostriction to increase the self-pinning effect. Preferably, where cobalt-iron is utilized in the first AP pinned layer and pure cobalt is utilized in the second AP pinned layer, both the magnetostriction and the magnetoresistive coefficient Δr/R of the sensor are advantageously increased.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 6 is a partial view of the slider and a merged magnetic head as seen in plane 6—6 of FIG. 2;

FIG. 7 is a partial ABS view of the slider taken along plane 7—7 of FIG. 6 to show the read and write elements of the merged magnetic head;

FIG. 8 is a view taken along plane 8—8 of FIG. 6 with all material above the coil layer and leads removed;

FIG. 14 is a flowchart which describes a method of making a spin valve sensor of the self-pinned type with cobalt formed in the second AP pinned layer of the AP self-pinned layer structure.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
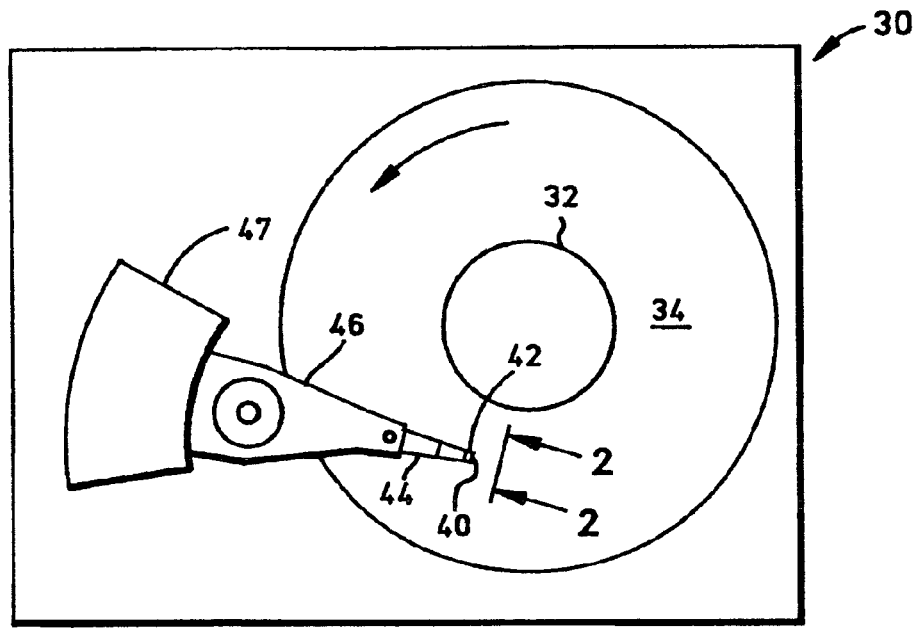
FIG. 1 is a plan view of an exemplary magnetic disk drive.
Figure 2:
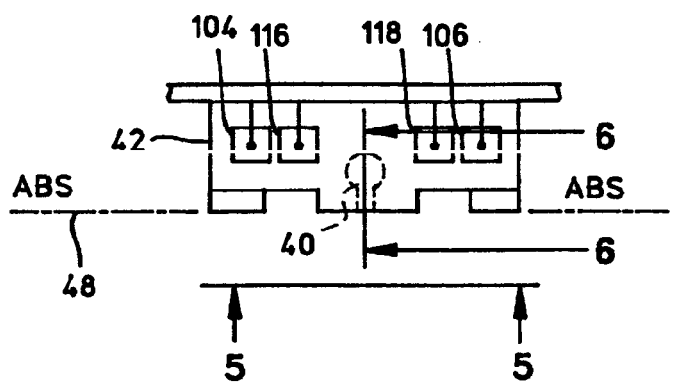
FIG. 2 is an end view of a slider with a magnetic head of the disk drive as seen in plane 2—2 of FIG. 1.
Figure 3:
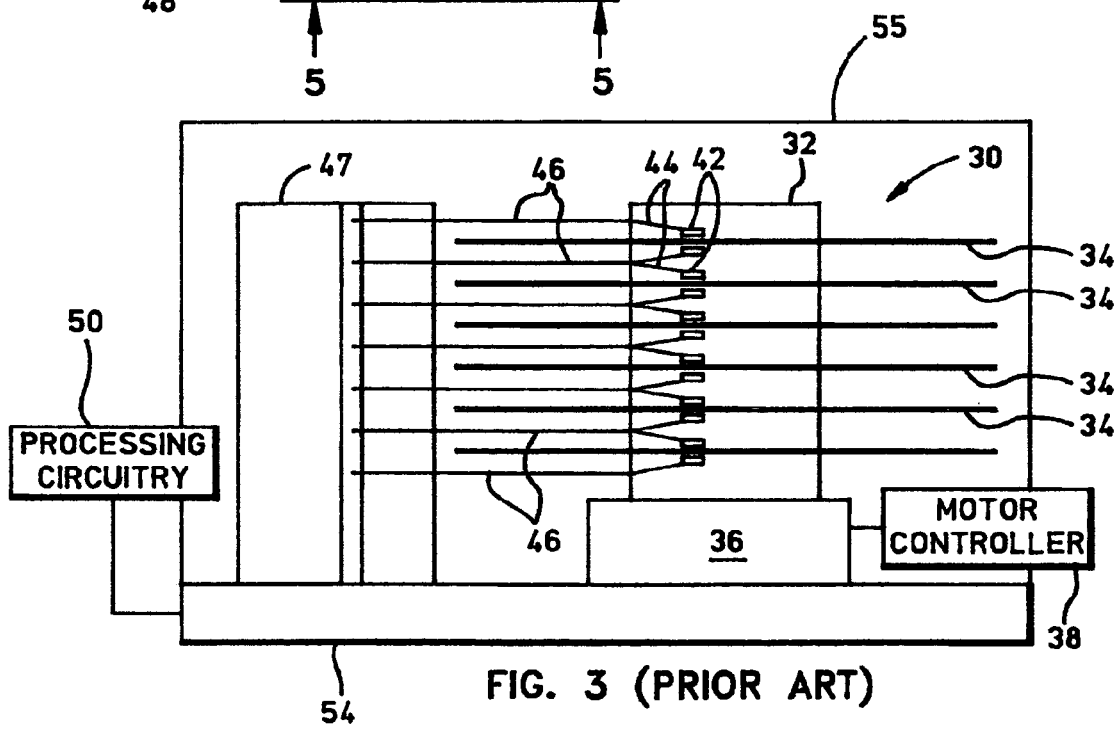
FIG. 3 is an elevation view of the magnetic disk drive wherein multiple disks and magnetic heads are employed.
Figure 4:
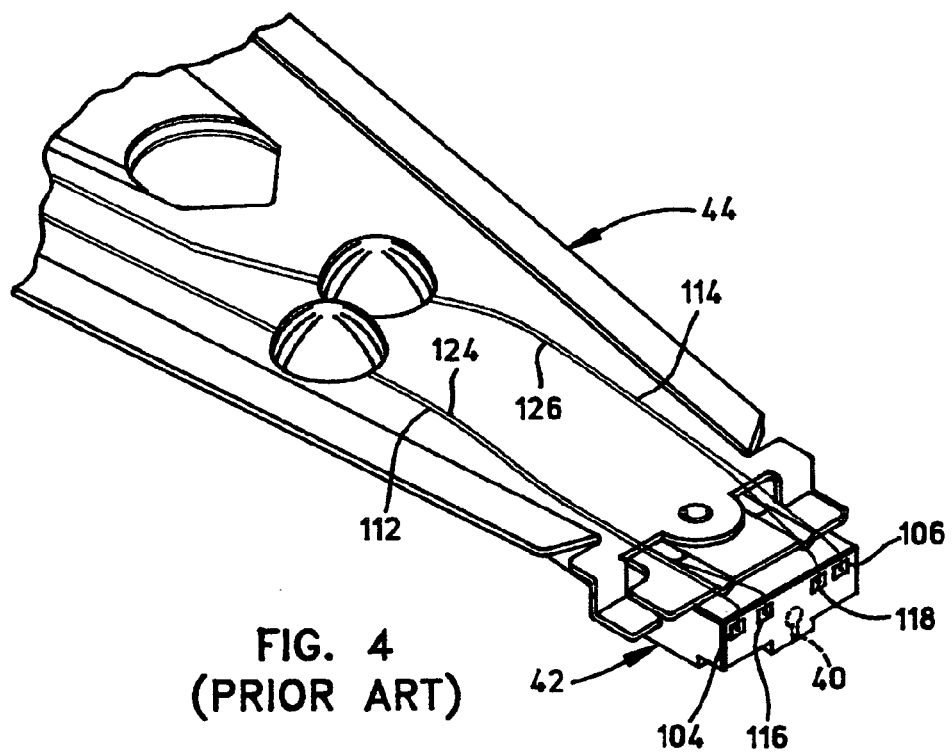
FIG. 4 is an isometric illustration of an exemplary suspension system for supporting the slider and magnetic head.
Figure 5:
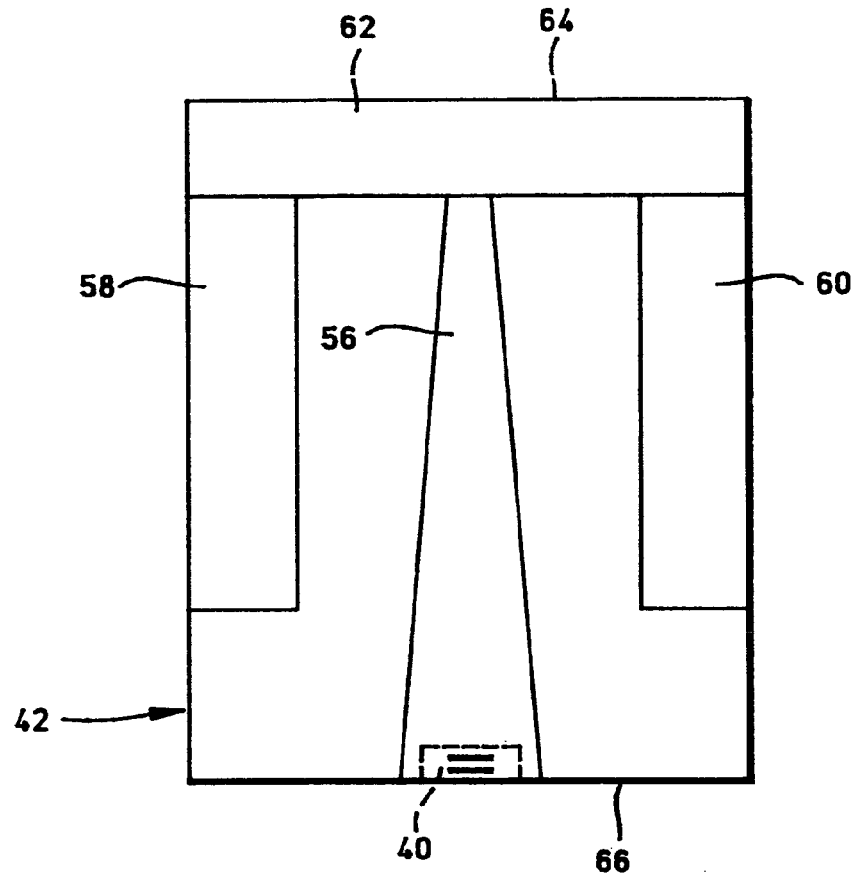
FIG. 5 is an ABS view of the magnetic head taken along plane 5—5 of FIG. 2.

Magnetic Disk Drive. Referring now to the drawings wherein like reference numerals designate like or similar parts throughout the several views, FIGS. 1–3 illustrate a magnetic disk drive 30. Disk drive 30 includes a spindle 32 that supports and rotates a magnetic disk 34. Spindle 32 is rotated by a spindle motor 36 that is controlled by a motor controller 38. A slider 42 includes a combined read and write magnetic head 40 and is supported by a suspension 44 and actuator arm 46 that is rotatably positioned by an actuator 47. A plurality of disks, sliders, and suspensions may be employed in a large capacity direct access storage device (DASD) as shown in FIG. 3. Suspension 44 and actuator arm 46 are moved by actuator 47 to position slider 42 so that magnetic head 40 is in a transducing relationship with a surface of magnetic disk 34. When disk 34 is rotated by spindle motor 36, slider 42 is supported on a thin (typically, 0.05 μm) cushion of air (air bearing) between the surface of disk 34 and an air bearing surface (ABS) 48. Magnetic head 40 may then be employed for writing information to multiple circular tracks on the surface of disk 34, as well as for reading information therefrom. Processing circuitry 50 exchanges signals, representing such information, with head 40, provides spindle motor drive signals for rotating magnetic disk 34, and provides control signals to actuator 47 for moving slider 42 to various tracks. In FIG. 4, slider 42 is shown mounted to a suspension 44. The components described hereinabove may be mounted on a frame 54 of a housing 55, as shown in FIG. 3. FIG. 5 is an ABS view of slider 42 and magnetic head 40. Slider 42 has a center rail 56 that supports magnetic head 40, and side rails 58 and 60. Rails 56, 58 and 60 extend from a cross rail 62. With respect to rotation of magnetic disk 34, cross rail 62 is at a leading edge 64 of slider 42 and magnetic head 40 is at a trailing edge 66 of slider 42.

FIG. 6 is a side cross-sectional elevation view of a merged magnetic head 40, which includes a write head portion 70 and a read head portion 72. Read head portion 72 includes a giant magnetoresistive (GMR) read head which utilizes a spin valve sensor 74 of the present invention. FIG. 7 is an ABS view of FIG. 6. Spin valve sensor 74 is sandwiched between nonmagnetic electrically insulative first and second read gap layers 76 and 78, and read gap layers 76 and 78 are sandwiched between ferromagnetic first and second shield layers 80 and 82. In response to external magnetic fields, the resistance of spin valve sensor 74 changes. A sense current Is conducted through the sensor causes these resistance changes to be manifested as potential changes. These potential changes are then processed as readback signals by processing circuitry 50 shown in FIG. 3.

Write head portion 70 of magnetic head 40 includes a coil layer 84 sandwiched between first and second insulation layers 86 and 88. A third insulation layer 90 may be employed for planarizing the head to eliminate ripples in the second insulation layer caused by coil layer 84. The first, second and third insulation layers are referred to in the art as an "insulation stack". Coil layer 84 and first, second and third insulation layers 86, 88 and 90 are sandwiched between first and second pole piece layers 92 and 94. First and second pole piece layers 92 and 94 are magnetically coupled at a back gap 96 and have first and second pole tips 98 and 100 which are separated by a write gap layer 102 at the ABS. Since second shield layer 82 and first pole piece layer 92 are a common layer, this head is known as a merged head. In a piggyback head an insulation layer is located between a second shield layer and a first pole piece layer. As shown in FIGS. 2 and 4, first and second solder connections 104 and 106 connect leads from spin valve sensor 74 to leads 112 and 114 on suspension 44, and third and fourth solder connections 116 and 118 connect leads 120 and 122 from the coil 84 (see FIG. 8) to leads 124 and 126 on suspension 44.

Figure 9:
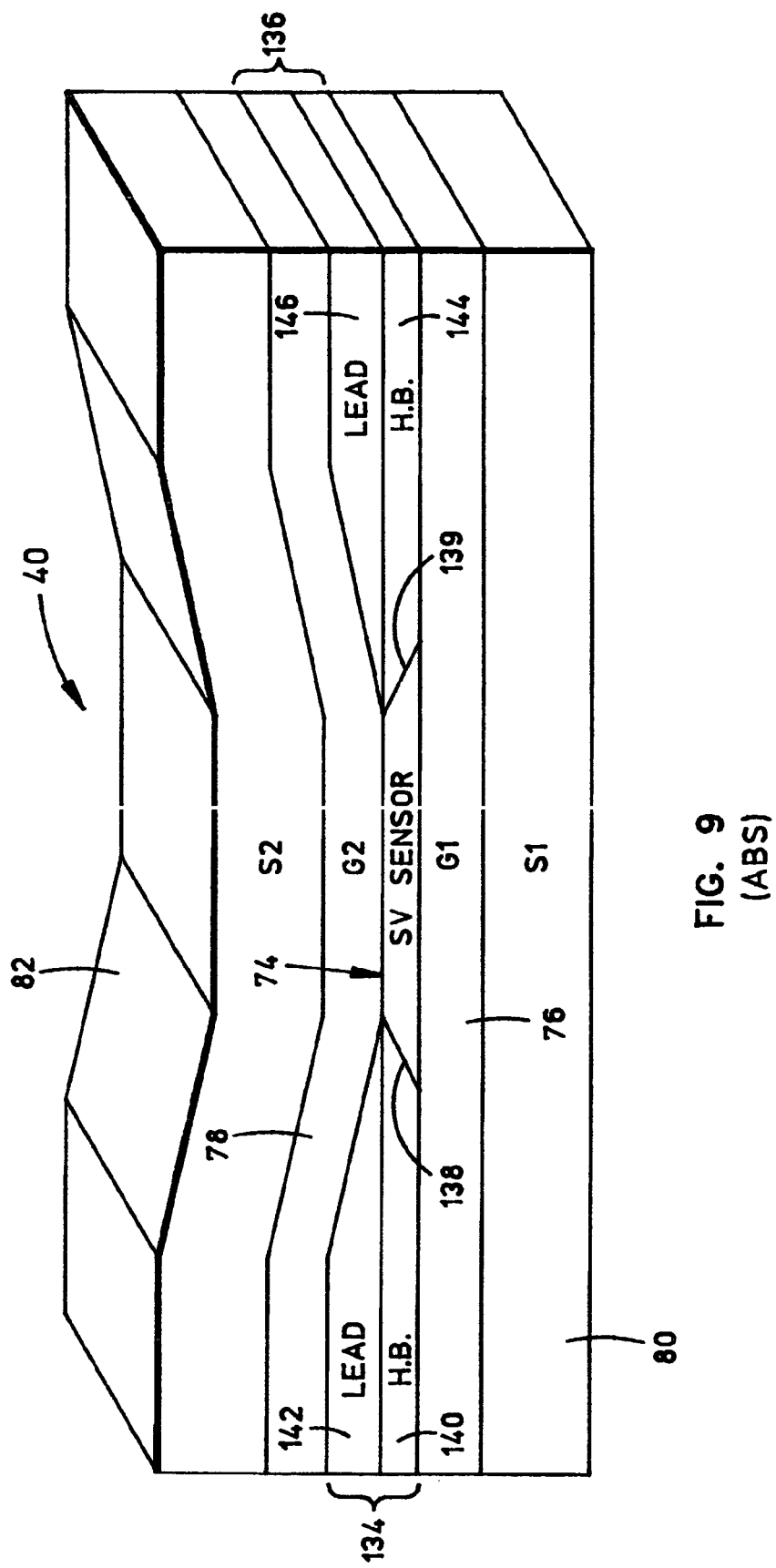
FIG. 9 is an enlarged isometric illustration of a read head having a spin valve sensor.

FIG. 9 is an enlarged isometric ABS illustration of read head 40 shown in FIG. 7 which includes spin valve sensor 74. First and second hard bias and lead layers 134 and 136 are connected to first and second side edges 138 and 139 of spin valve sensor 74. This connection is known in the art as a contiguous junction and is fully described in commonly assigned U.S. Pat. No. 5,018,037 which is incorporated by reference herein. First hard bias and lead layers 134 include a first hard bias layer 140 and a first lead layer 142, and second hard bias and lead layers 136 include a second hard bias layer 144 and a second lead layer 146. Hard bias layers 140 and 144 cause magnetic fields to extend longitudinally through spin valve sensor 74 for stabilizing the magnetic domains therein. Spin valve sensor 74 and first and second hard bias and lead layers 134 and 136 are located between the nonmagnetic electrically insulative first and second read gap layers 76 and 78. First and second read gap layers 76 and 78 are, in turn, located between ferromagnetic first and second shield layers 80 and 82.

Figure 10:
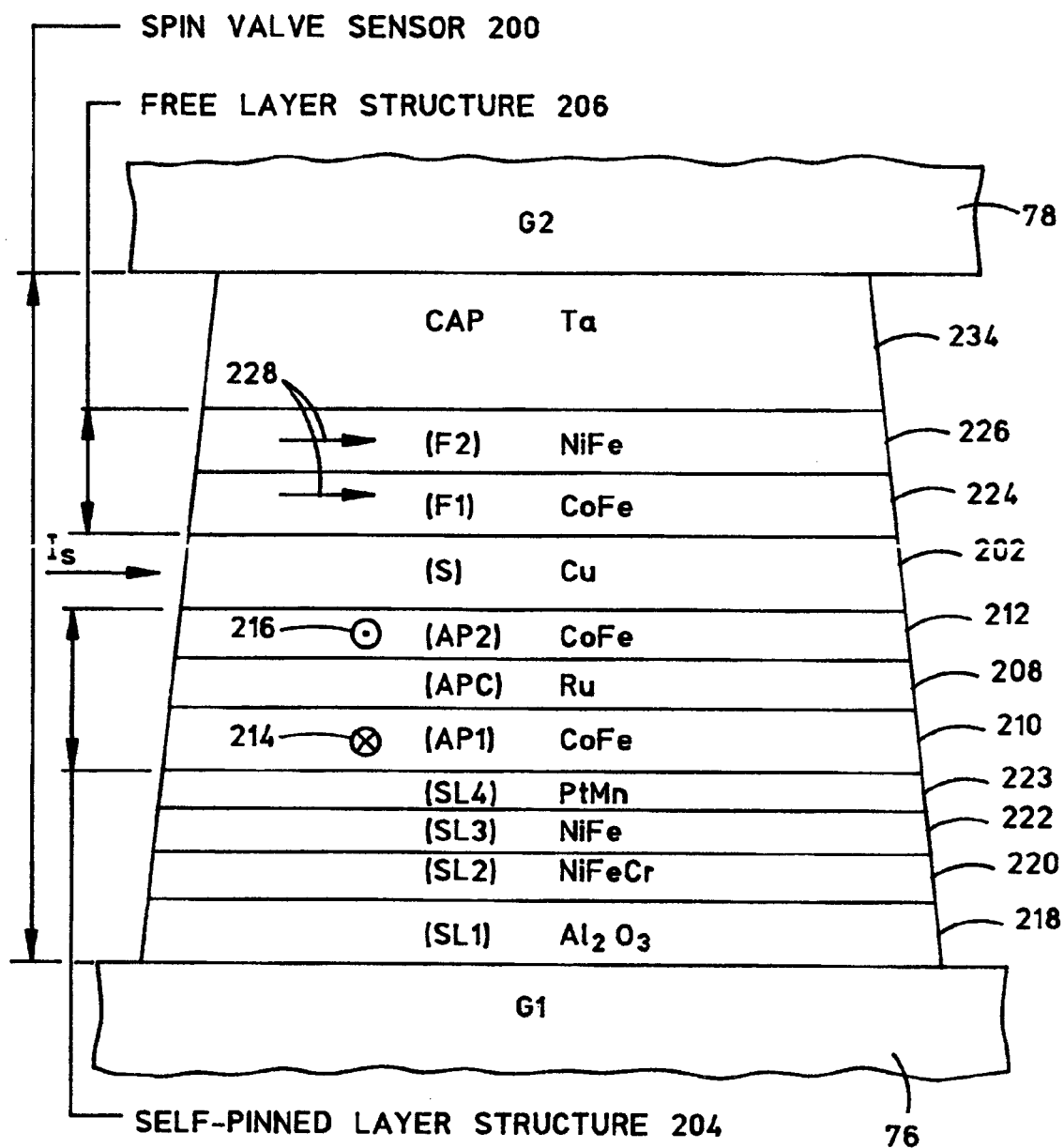
FIG. 10 is an ABS illustration of a typical multi-layer structure of a spin valve sensor of the self-pinned type.

FIG. 10 shows an ABS illustration of a typical multi-layered structure of a spin valve sensor 200 of the self-pinned type located between first and second read gap layers 76 and 78. Spin valve sensor 200 includes a non-magnetic electrically conductive spacer (S) layer 202 which is located between an antiparallel (AP) self-pinned layer structure 204 and a free layer structure 206. AP self-pinned layer structure 204 includes an antiparallel coupling (APC) layer 208 which is located between first and second ferromagnetic AP pinned layers (API) and (AP2) 210 and 212. First, second, third, and fourth seed layers (SL1) 218, (SL2) 220, (SL3) 222, and (SL4) 223 may be provided between first read gap layer 76 and pinning layer 214 for promoting a desirable texture of the layers deposited thereon. Free layer structure 206 includes first and second free ferromagnetic layers (F1) and (F2) 224 and 226, with first free layer 224 interfacing spacer layer 202. Free layer structure 224 has a magnetic moment 228 which is oriented parallel to the ABS and to the major planes of the layers in a direction from right to left, or from left to right, as shown in FIG. 10. A cap or capping layer 234 is formed over free layer structure 206 for protecting the sensor.

Note that no antiferromagnetic (AFM) pinning layer in FIG. 10 is necessary for pinning within spin valve sensor 200. In a non-self-pinned type application, first AP pinned layer 210 is exchange-coupled to an AFM pinning layer which pins a magnetic moment 214 of first AP pinned layer 210 perpendicular to the ABS in a direction out of or into spin valve sensor 200, as shown in FIG. 10. By strong antiparallel coupling between first and second AP pinned layers 210 and 212, a magnetic moment 216 of second AP pinned layer 212 is antiparallel to magnetic moment 214. A self-pinned spin valve sensor, however, relies on magneto-striction of AP self-pinned layer structure 204 as well as ABS stress for a self-pinning effect. Conventionally, cobalt-iron is used for both first and the second AP pinned layers 210 and 212 of the AP self-pinned layer structure 204. An AFM pinning layer, which is typically as thick as 150 Angstroms, is not necessary for pinning and therefore a relatively thin sensor can be fabricated.

When a signal field from the rotating magnetic disk rotates magnetic moment 228 into the sensor, magnetic moments 228 and 216 become more antiparallel which increases the resistance of the sensor to the sense current ($I_S$). When a signal field rotates magnetic moment 228 of free layer structure 206, magnetic moments 228 and 216 become more parallel which reduces the resistance of sensor 200 to the sense current ($I_S$). These resistance changes are processed as playback signals by processing circuitry (i.e. processing circuitry 50 of FIG. 3).

The following materials may be utilized in the multilayered spin valve sensor 200 of FIG. 10. First, second, third, and fourth seed layers are made of alumina ($Al_2O_3$), nickel-iron-chromium (NiFeCr), nickel-iron (NiFe), and platinum-manganese (PtMn), respectively, from bottom to top; AP pinned layers 210 and 212 of AP self-pinned layer structure 204 are made of cobalt-iron (CoFe); APC layer 208 is made of ruthenium (Ru); first and second free layers 224 and 226 are made of cobalt-iron (CoFe) and nickel-iron (NiFe), respectively; spacer layer 202 is made of copper (Cu); and capping layer 234 is made of tantalum (Ta). An additional copper (Cu) layer may be formed over second free layer 226 for reflecting conduction electrons back into the mean free path of conduction electrons Thicknesses of particular materials for spin valve sensor 200 may be 30 Angstroms of $Al_2O_3$ for first seed layer 218, 30 Angstroms of NiFeCr for second seed layer 220, 10 Angstroms of NiFe for third seed layer 222, 30 Angstroms of PtMn for fourth seed layer 223; various thicknesses X of $Co_{90}Fe_{10}$ for first AP pinned layer 210; 8 Angstroms of Ru for APC layer 208; various thicknesses Z of $Co_{90}Fe_{10}$ for second AP pinned layer 212; 20 Angstroms of Cu for spacer layer 202; 15 Angstroms of $Co_{90}Fe_{10}$ for first free layer 224; 15 Angstroms of $Ni_{83}Fe_{17}$ for second free layer 226; and 40 Angstroms of Ta for capping layer 234. If sensor 200 were not a self-pinned type sensor, an AFM pinning layer of PtMn having a thickness of 150 Angstroms would need to be formed between third seed layer 222 and pinned layer structure 204 for pinning the magnetic moment 214 of first AP pinned layer 210. Note that the thickness of fourth seed layer 223 of PtMn at 30 Angstroms is not sufficient to provide any pinning effect, which quickly decreases when the PtMn is at or below 75 Angstroms and is negligible at or below 50 Angstroms. Preferably, this fourth top seed layer 223 of PtMn is between 5–75 Angstroms.

Self-Pinned Antiparallel (AP) Pinned Layer Structure Comprising a Cobalt Layer. As described in the Background section, it is generally true that proportionally increasing the iron content in cobalt-iron increases the magnetostriction in an AP self-pinned layer structure. For example, the magnetostriction increases by about a factor of two (2) with use of $Co_{60}Fe_{40}$ materials in the AP self-pinned layers. However, we have found that cobalt material in itself provides more positive magnetostriction than cobalt-iron in self-pinned applications. In fact, measurements show that the magnetostriction can be increased by 50% to almost a factor of three (3) with use of a cobalt film in a particular configuration. Advantageously, the self-pinning effect in an AP self-pinned layer structure can be increased. Since the cobalt layer does not include any iron content, the interdiffusion problem observed with use of $Co_{60}Fe_{40}$ materials is avoided. Furthermore, we have found that a more specific arrangement of cobalt film in the AP self-pinned layer structure provides an additional advantage. Specifically, the magnetoresistance coefficient $\Delta r/R$ of the sensor as well as the magnetostriction may be increased by utilizing cobalt (Co) in the second AP pinned layer and cobalt-iron (CoFe) in the first AP pinned layer.

Figure 11:
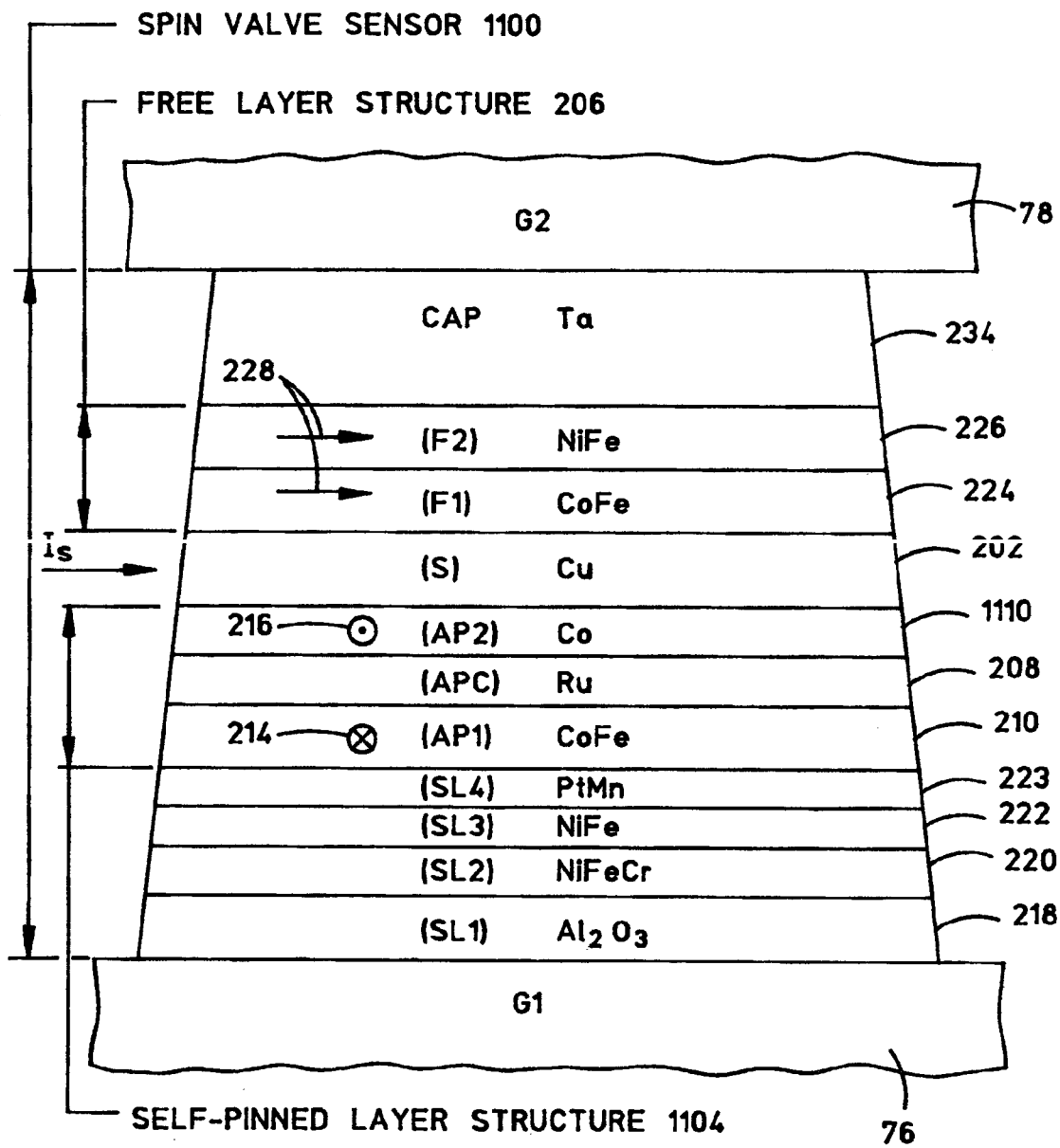
FIG. 11 is an ABS illustration of a first example of a multi-layer structure of a spin valve sensor of the self-pinned type with cobalt formed in a first antiparallel (AP) pinned layer of an AP self-pinned layer structure for increased magnetostriction.
Figure 12:
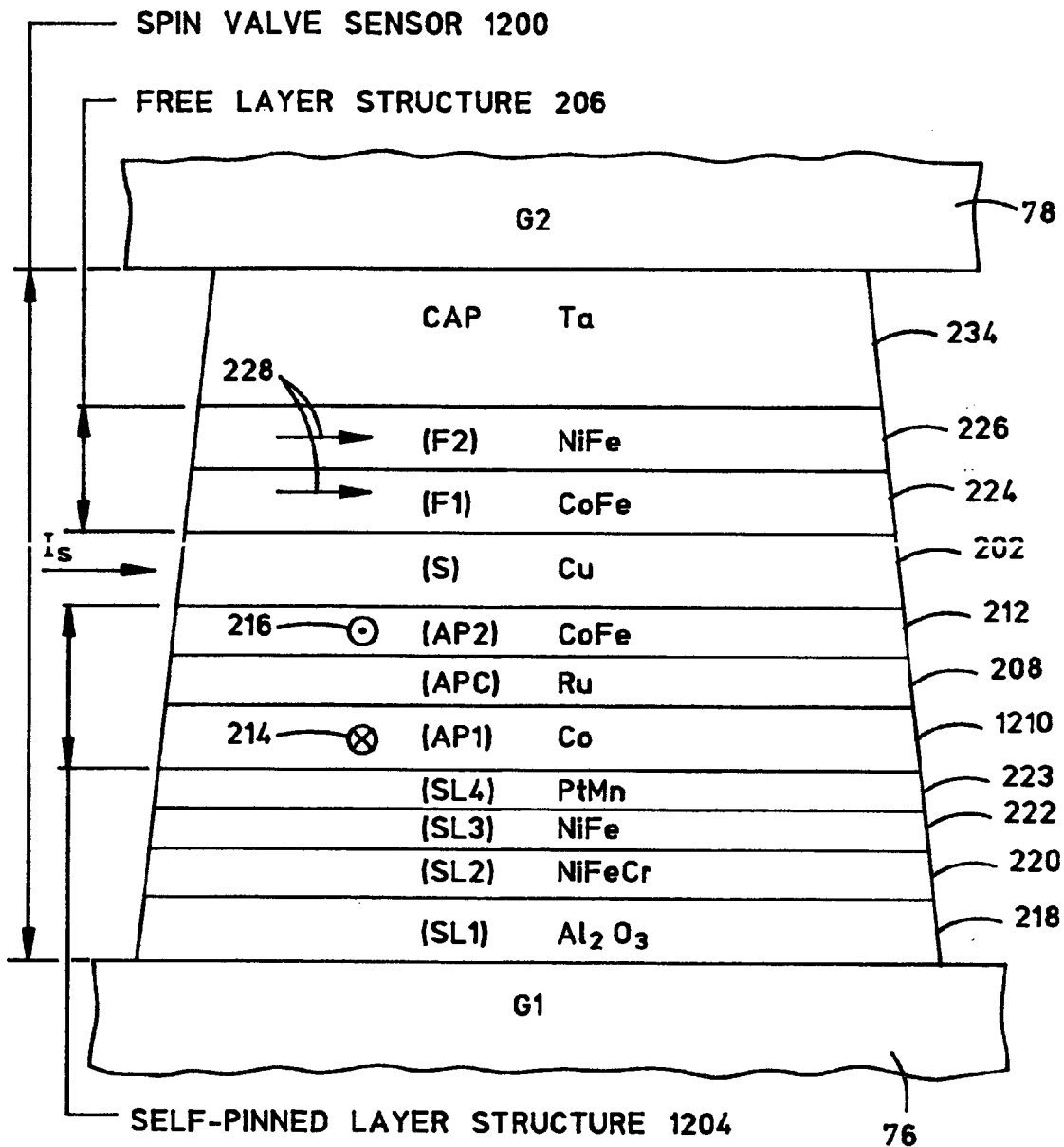
FIG. 12 is an ABS illustration of a second example of a multi-layer structure of a spin valve sensor of the self-pinned type with cobalt formed in a second AP pinned layer of the AP pinned layer structure for increased magnetostriction.
Figure 13:
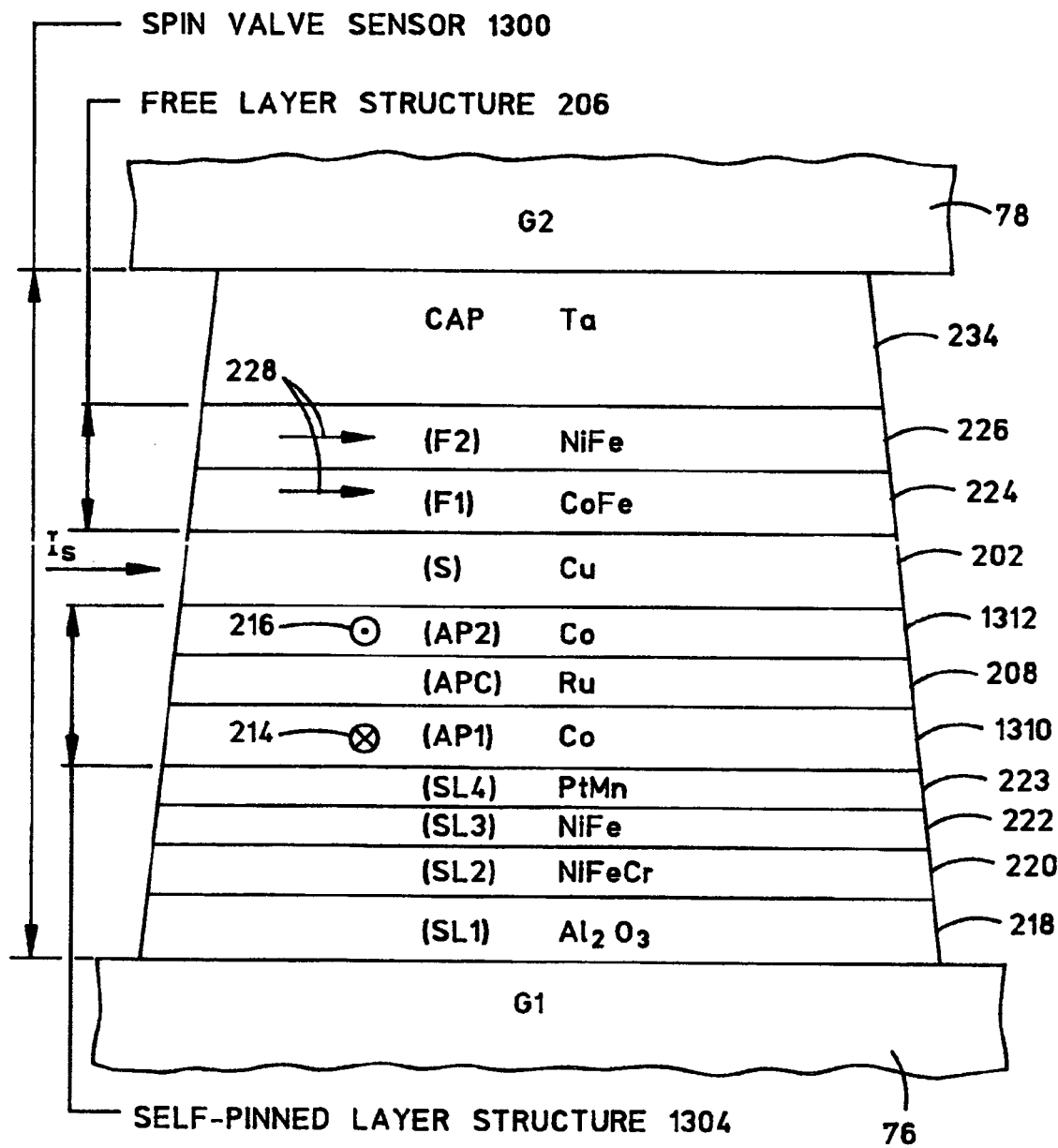
FIG. 13 is an ABS illustration of a third example of a multi-layer structure of a spin valve sensor of the self-pinned type with cobalt formed in both the first and the second AP pinned layers of the AP self-pinned layer structure for increased magnetostriction.

FIGS. 11–13 show ABS illustrations of multi-layered structures of spin valve sensors 1100, 1200, 1300 of the present invention. Spin valve sensors 1100, 1200, and 1300 of FIGS. 11–13 are of the self-pinned type similar to that shown and described in relation to FIG. 10; however, at least one of the layers in the antiparallel (AP) self-pinned layer includes cobalt (Co) in place of the cobalt-iron (CoFe) alloy. Preferably, the cobalt utilized in the AP pinned layer(s) is pure cobalt having no iron content.

More particularly, spin valve sensor 1100 of FIG. 11 uses cobalt (Co) in a second AP pinned layer 1110 of an AP self-pinned layer structure 1104 but cobalt-iron (CoFe) in first AP pinned layer 210. On the other hand, spin valve sensor 1200 of FIG. 12 uses cobalt (Co) in a first AP pinned layer 1210 of an AP self-pinned layer structure 1204 but cobalt-iron (CoFe) in second AP pinned layer 212. Finally, spin valve sensor 1300 of FIG. 13 uses cobalt (Co) in both first and second AP pinned layers 1310 and 1312 of an AP self-pinned layer structure 1304. Preferably, the thickness of the cobalt in any of these AP pinned layers is between about 10–30 Angstroms, or more particularly about 18 Angstroms. Note also that, in each of the embodiments of FIGS. 11–13, cobalt-iron (CoFe) and nickel-iron (NiFe) are utilized in free layer structure 206.

Advantageously, the use of cobalt in at least one of the AP pinned layers increases the magnetostriction of the AP self-pinned layer structure. Accordingly, the self-pinning effect in the AP self-pinned layer structure is improved. Note that the pinning strength of the AP self-pinned layer structure is related to the anisotropy field which may be expressed as $$H_{K\lambda} = 2K_\lambda / M_s$$

where $K_\lambda$ is the antisotropy constant which may be expressed as $$K_\lambda = (3/2) * ABS\ stress * magnetostriction$$

and $M_s$ is the saturation magnetization.

Table 1 below provides measurement data for various properties of spin valve sensors with and without cobalt (Co) in the AP self-pinned layer structure. In Table 1, $H_c$ is the coercivity, $H_k$ is the uniaxial anisotropy field, $H_{ch}$ is the hard-axis coercivity, R is the resistance of the spin valve, VSM is a Vibrating Sample Magnometer measurement, and $\lambda$ is the magnetostriction coefficient. In particular, columns 2 and 4 provide data for the case where cobalt (Co) is utilized in the AP self-pinned layer structure.

TABLE 1

Spin valve properties with and without cobalt in AP self-pinned layer structure.

| Run # | 1 | 2 | 3 | 4 |
|---|---|---|---|---|
| Cap 2 (Ta) (A) | 40 | 40 | 40 | 40 |
| Cap 1 (Cu) (A) | 0 | 0 | 20 | 20 |
| AP Self-Pinned-2 (A) | CoFe 0 | CoFe 0 | CoFe 18 | Co18 |
| Spacer (Ru) (A) | 28 | 29 | 28 | 29.5 |
| AP Self-Pinned-1 (A) | CoFe 18 | Co 18 | CoFe 0 | CoFe 0 |
| Seed-4/PtMn (A) | 30 | 30 | 30 | 30 |
| Seed-3/NiFe (A) | 8 | 8 | 8 | 8 |
| Seed 2/NiFeCr (A) | 25 | 25 | 25 | 25 |
| Seed 1 (Al$_2$O$_3$) | 30 | 30 | 30 | 30 |
| $H_c$ (Oe) | 11 | 24 | 5 | 16 |
| $H_k$ (Oe) | 24 | 80 | 15 | 58 |
| $H_{ch}$ (Oe) | 9 | 23 | 4 | 17 |
| R (Ω/sq.) | 93 | 88 | 47 | 44.5 |
| Thickness | 22.7 | 22.7 | 23 | 21 |
| $\lambda_{actual}$ (×10$^{-6}$) | 18 | 27 | 5.5 | 19.5 |

As apparent from the Table 1 data, it is unexpected that pure cobalt material would provide such a high positive magnetostriction, but it does in these structures. With increased magnetostriction, the self-pinned structure exhibits better pinning. Also note that the intrinsic anisotropy $H_k$ of the first and the second AP pinned layers are also improved.

Table 2 below provides measurement data of R and Δr/R for spin valve sensors in a few different configurations using cobalt within the AP self-pinned layer structure. In Table 2, R is the resistance of the spin valve and Δr/R is the magnetoresistive coefficient.

TABLE 2

Δr/R and R values with and without cobalt in AP self-pinned layer structure.

| Run # | 1 | 2 | 3 |
|---|---|---|---|
| Cap (Ta) (A) | 40 | 40 | 40 |
| Free 2(NiFe) (A) | 15 | 15 | 15 |
| Free 1 (CoFe) (A) | 15 | 15 | 15 |
| Spacer (Cu) (A) | 20 | 20 | 20 |
| AP Self-Pinned-2 (A) | Co 18 | Co 18 | CoFe 18 |
| Spacer (Ru) (A) | 28 | 29 | 28 |
| AP Self-Pinned-1 (A) | Co 18 | CoFe 18 | CoFe 18 |
| Seed-4/PtMn (A) | 30 | 30 | 30 |
| Seed-3/NiFe (A) | 8 | 8 | 8 |
| Seed 2/NiFeCr (A) | 25 | 25 | 25 |
| Seed 1 (Al$_2$O$_3$) | 30 | 30 | 30 |
| Δr/R (%) | 15 | 16.4 | 15.1 |
| R (Ω/sq.) | 24 | 25.8 | 26 |

As apparent from the Table 2 data, the magnetoresistance coefficient Δr/R is additionally enhanced by utilizing cobalt in the second AP pinned layer and cobalt-iron (CoFe) in the first AP pinned layer. The Δr/R was shown to be relatively lower using cobalt in both the first and the second AP pinned layers in comparison to the mixed case, which was shown to have a higher Δr/R and magnetostriction. This preferred arrangement (AP-1 with CoFe and AP-2 with Co) was chosen since the largest magnetostriction gain is provided with cobalt in the second AP pinned layer while Δr/R enhancement is provided with cobalt-iron in the first AP pinned layer.

FIG. 14 is a flowchart which describes a method of making a spin valve sensor of the self-pinned type described in relation to FIGS. 11–13. Although the method described in relation to the flowchart of FIG. 14 relates to a bottom-pinned type spin valve, one skilled in the art will understand that it is applicable to top-pinned type spin valves as well as others. Furthermore, although the method describes the formation of cobalt in only the second AP pinned layer of the self-pinned structure, it may be formed in the first AP pinned layer alternatively or in combination therewith.

Beginning at a start block 1400, a seed layer is deposited over a substrate (step 1402), such as over a dielectric gap layer of a magnetic head. In the present embodiment, the seed layer is a multi-layer seed layer of Al$_2$O$_3$, NiFeCr, NiFe, and PtMn, from bottom to top (with the PtMn having a thickness of about 30 Angstroms). Next, an antiparallel (AP) self-pinned layer structure is formed over the seed layer. In this process, at least one of the first and the second AP pinned layers of the AP self-pinned layer structure is formed with cobalt having no iron content.

To form the AP self-pinned layer structure, a first AP pinned layer of cobalt-iron (CoFe) is deposited over the seed layer (step 1406). This first AP pinned layer of CoFe may be formed to a thickness of about 18 Angstroms, or more generally to a thickness of between about 10–30 Angstroms. Next, an antiparallel coupling (APC) layer is deposited over the first AP pinned layer (step 1408). The APC layer may be any suitable material, such as ruthenium (Ru), and deposited to a thickness of about 8 Angstroms, or more generally to a thickness of between about 3–9 Angstroms. Finally, a second AP pinned layer of cobalt (Co) is deposited over the APC layer (step 1410). This second AP pinned layer of Co may be formed to a thickness of about 18 Angstroms, or more generally to a thickness of between about 10–30 Angstroms.

Note that the AP pinned layer structure will become self-pinned by its magnetostriction as well as ABS stress. An AFM pinning layer, which is typically as thick as 150 Angstroms, is not necessary for pinning purposes. Note that the thickness of top seed layer of PtMn at 30 Angstroms is not sufficient to provide any pinning effect, which quickly decreases when the PtMn is at or below 75 Angstroms and is negligible at or below 50 Angstroms. Preferably, the top seed layer of PtMn is between 5–75 Angstroms (i.e. at least below 75 Angstroms).

A non-magnetic electrically conductive spacer layer (e.g. Cu) is then deposited over the AP self-pinned layer structure (step 1412). Next, a free layer structure is formed over the spacer layer (step 1414). The free layer structure may be a single ferromagnetic layer or multi-layer structure which may include cobalt-iron and nickel-iron, as examples. Preferably, the free layer structure is a bi-layer ferromagnetic structure which includes a bottom layer of cobalt-iron (CoFe) (deposited to a thickness of between about 15 Angstroms) and a top layer of nickel-iron (NiFe) (deposited to a thickness of between about 15 Angstroms). Finally, a capping layer is deposited over the free layer structure (step 1416). The capping layer is preferably tantalum (Ta), but other materials such as copper (Cu) and ruthenium (Ru) may be utilized as alternatives or in combination therewith.

As described, a spin valve sensor of a magnetic head has a free layer structure; an antiparallel (AP) self-pinned layer structure; and a non-magnetic electrically conductive spacer layer in between the free layer structure and the AP self-pinned layer structure. The AP self-pinned layer structure includes a first AP pinned layer; a second AP pinned layer; an antiparallel coupling (APC) layer formed between the first and the second AP pinned layers. At least one of the first and the second AP pinned layers is made of cobalt having no iron content. The other AP pinned layer may be formed of cobalt, cobalt-iron, or other suitable material. The use of cobalt in the AP self-pinned layer structure increases its magnetostriction to increase the self-pinning effect. Preferably, the first AP pinned layer is cobalt-iron and the second AP pinned layer is cobalt which provides for both an increase in the magnetostriction and the magnetoresistive coefficient Δr/R of the spin valve sensor.

A method of making a spin valve sensor for a magnetic head includes the steps of forming a free layer structure and an antiparallel (AP) self-pinned layer structure which are separated by a non-magnetic electrically conductive spacer layer; and forming the AP self-pinned layer structure with a first AP pinned layer, a second AP pinned layer, an antiparallel coupling (APC) layer, wherein at least one of the first and the second AP pinned layers is made of cobalt.

A disk drive of the present invention includes a housing; a magnetic disk rotatably supported in the housing; a magnetic head assembly; a support mounted in the housing for supporting the magnetic head assembly so as to be in a transducing relationship with the magnetic disk; a spindle motor for rotating the magnetic disk; an actuator positioning means connected to the support for moving the magnetic head assembly to multiple positions with respect to said magnetic disk; a processor connected to the magnetic head assembly, to the spindle motor, and to the actuator for exchanging signals with the magnetic head assembly for controlling movement of the magnetic disk and for controlling the position of the magnetic head assembly; the magnetic head assembly including a read head which has a spin valve sensor comprising a free layer structure; an antiparallel (AP) self-pinned layer structure; a non-magnetic electrically conductive spacer layer in between the free layer structure and the AP self-pinned layer structure; wherein the AP self-pinned layer structure includes a first AP pinned layer; a second AP pinned layer; an antiparallel coupling (APC) layer formed between the first and the second AP pinned layer; wherein at least one of the first and the second AP pinned layers comprises a cobalt layer.

It is to be understood that the above is merely a description of preferred embodiments of the invention and that various changes, alterations, and variations may be made without departing from the true spirit and scope of the invention as set for in the appended claims. Although the specific sensors described herein have been bottom-pinned type spin valves, one skilled in the art will understand that it is applicable to top-pinned type spin valves and others. Few if any of the terms or phrases in the specification and claims have been given any special meaning different from their plain language meaning, and therefore the specification is not to be used to define terms in an unduly narrow sense.

What is claimed is:

1. A spin valve sensor for a magnetic head, comprising:
    a free layer structure;
    an antiparallel (AP) self-pinned layer structure;
    a non-magnetic electrically conductive spacer layer in between the free layer structure and the AP self-pinned layer structure;
    the AP self-pinned layer structure being pinned by its magnetostriction and air bearing surface (ABS) stress without any antiferromagnetic (AFM) layer being utilized for pinning;
    the AP self-pinned layer structure including:
        a first AP pinned layer comprising a cobalt-iron layer;
        a second AP pinned layer comprising a cobalt layer and including no iron content;
        the second AP pinned layer being in closer proximity to the free layer structure than the first AP pinned layer; and
        an antiparallel coupling (APC) layer formed between the first and the second AP pinned layers.

2. The spin valve sensor of claim 1, wherein the second AP pinned layer comprising the cobalt layer consists of cobalt.

3. The spin valve sensor of claim 1, wherein the magnetostriction which self-pins the AP self-pinned layer structure is increased from use of the cobalt layer.

4. The spin valve sensor of claim 1, wherein a magnetostriction of the first and the second AP pinned layers and a magnetoresistive coefficient of the spin valve sensor are increased from use of the cobalt layer.

5. The spin valve sensor of claim 1, further comprising:
    a seed layer which includes a layer of platinum-manganese (PtMn) with a thickness less than 75 Angstroms.

6. A disk drive, comprising:
    a housing;
    a magnetic disk rotatably supported in the housing;
    a magnetic head assembly;
    a support mounted in the housing for supporting the magnetic head assembly so as to be in a transducing relationship with the magnetic disk;
    a spindle motor for rotating the magnetic disk;
    an actuator positioning means connected to the support for moving the magnetic head assembly to multiple positions with respect to said magnetic disk;
    a processor connected to the magnetic head assembly, to the spindle motor, and to the actuator for exchanging signals with the magnetic head assembly for controlling movement of the magnetic disk and for controlling the position of the magnetic head assembly;

the magnetic head assembly including a read head; the read head including a spin valve sensor comprising:

a free layer structure;

an antiparallel (AP) self-pinned layer structure;

a non-magnetic electrically conductive spacer layer in between the free layer structure and the AP self-pinned layer structure;

the AP self-pinned layer structure being pinned by its magnetostriction and air bearing surface (ABS) stress without any antiferromagnetic (AFM) layer being utilized for pinning;

the AP self-pinned layer structure including:

a first AP pinned layer comprising a cobalt-iron layer;

a second AP pinned layer comprising a cobalt layer and including no iron content;

the second AP pinned layer being in closer proximity to the free layer structure than the first AP pinned layer; and an antiparallel coupling (APC) layer formed between the first and the second AP pinned layer.

7. The disk drive of claim 6, wherein the second AP pinned layer comprising the cobalt layer consists of cobalt.

8. The disk drive of claim 6, wherein the free layer structure comprises a cobalt-iron layer.

9. The disk drive of claim 6, wherein a magnetostriction which self-pins the AP self-pinned layer structure is increased from use of the cobalt layer.

10. The disk drive of claim 6, wherein the spin valve sensor further comprises:

a seed layer which includes a layer of platinum-manganese (PtMn) with a thickness less than 75 Angstroms.

11. The disk drive of claim 6, wherein the magnetostriction of the first and the second AP pinned layers and a magnetoresistive coefficient of the spin valve sensor are increased from use of the cobalt layer.

12. A method of making a spin valve sensor for a magnetic head, comprising:

forming a free layer structure and an antiparallel (AP) self-pinned layer structure which are separated by a non-magnetic electrically conductive spacer layer, the AP self-pinned layer structure being pinned by its magnetostriction and air bearing surface (ABS) stress without any antiferromagnetic (AFM) layer being utilized for pinning; and forming the AP self-pinned layer structure with a first AP pinned layer comprising a cobalt-iron layer, a second AP pinned layer comprising a cobalt layer and including no iron content, and an antiparallel coupling (APC) layer between the first and the second AP pinned layers, the second AP pinned layer being in closer proximity to the free layer structure than the first AP pinned layer.

13. The method of claim 12, wherein the second AP pinned layer being formed with the cobalt layer having no iron content and the first AP pinned layer structure being formed with cobalt-iron increases a magnetoresistive coefficient $\Delta r/R$ of the spin valve sensor.

14. The method of claim 12, wherein the second AP pinned layer being formed with the cobalt layer having no iron content increases the magnetostriction of the AP self-pinned layer structure for improved self-pinning.

15. The method of claim 12, wherein the free layer structure is formed with cobalt-iron.

* * * * *